US010922738B2

(12) United States Patent
Swierk et al.

(10) Patent No.: US 10,922,738 B2
(45) Date of Patent: Feb. 16, 2021

(54) INTELLIGENT ASSISTANCE FOR SUPPORT AGENTS

(71) Applicant: Dell Products, L.P., Round Rock, TX (US)

(72) Inventors: Todd Erick Swierk, Austin, TX (US); Tyler Ryan Cox, Austin, TX (US); Marc Randall Hammons, Round Rock, TX (US); Abbey Barretto, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 262 days.

(21) Appl. No.: 15/979,598

(22) Filed: May 15, 2018

(65) Prior Publication Data
US 2019/0355042 A1 Nov. 21, 2019

(51) Int. Cl.
G06Q 30/06 (2012.01)
G06N 5/02 (2006.01)
G10L 15/18 (2013.01)
G10L 15/22 (2006.01)
G10L 25/63 (2013.01)
G10L 15/183 (2013.01)
G06Q 30/00 (2012.01)
G10L 15/08 (2006.01)

(52) U.S. Cl.
CPC ......... G06Q 30/0631 (2013.01); G06N 5/022 (2013.01); G06Q 30/012 (2013.01); G06Q 30/016 (2013.01); G10L 15/183 (2013.01); G10L 15/1815 (2013.01); G10L 15/22 (2013.01); G10L 25/63 (2013.01); G10L 2015/088 (2013.01)

(58) Field of Classification Search
CPC ... G06Q 30/0601–0645; G06Q 30/016; G06Q 30/012; G10L 15/1815; G10L 15/183; G10L 25/63
USPC ................................................ 705/26.1–27.2
See application file for complete search history.

(56) References Cited

U.S. PATENT DOCUMENTS 10,009,465 B1 * 6/2018 Fang ................... H04M 3/5175
10,147,427 B1 * 12/2018 Johnson ............. G10L 15/1815
2003/0200094 A1 * 10/2003 Gupta ................... G10L 15/063
704/270.1

(Continued)

OTHER PUBLICATIONS

Duncan, D. S. K. (1992). Negotiation, cooperative work and conflict in the provision of technical help: An empirical study of telephone computer support (Order No. 9227654). Available from ProQuest Dissertations and Theses Professional. (303998722). Retrieved from https://dialog.proquest.com/professional/docview/3.*

Primary Examiner — Resha Desai
(74) Attorney, Agent, or Firm — Fogarty LLP

(57) ABSTRACT

Systems and methods for providing intelligent assistance to support agents. In some embodiments, an Information Handling System (IHS) may include: a processor; and a memory coupled to the processor, the memory having program instructions stored thereon that, upon execution, cause the IHS to: transmit audio to a voice service provider, wherein the audio is captured during a call between a customer and a support agent concerning a product; receive a text instruction from the voice service provider; retrieve support information relevant to the product based upon the text instruction; and display the support information to the support agent.

8 Claims, 5 Drawing Sheets

(56) References Cited

U.S. PATENT DOCUMENTS

| | | | |
|---|---|---|---|
| 2006/0069577 A1* | 3/2006 | Schmitt | G06Q 10/10 |
| | | | 705/304 |
| 2015/0180985 A1* | 6/2015 | Seibert | H04L 67/146 |
| | | | 709/206 |
| 2016/0048502 A1* | 2/2016 | Montenegro | H04M 3/5166 |
| | | | 379/265.1 |
| 2017/0270099 A1* | 9/2017 | Gorny | G06Q 30/01 |
| 2018/0167504 A1* | 6/2018 | Dunmire | H04M 3/5158 |

\* cited by examiner

INTELLIGENT ASSISTANCE FOR SUPPORT AGENTS

FIELD

The present disclosure generally relates to Information Handling Systems (IHSs), and, more particularly, to systems and methods for providing intelligent assistance to support agents.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and components may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In 2017, virtual assistants were estimated to have around 1 billion users worldwide. A virtual assistant is a software agent that performs computing tasks or services on behalf of a user, such as weather forecasting, setting alarms, making to-do lists, listening to music, playing videos, online shopping, etc. In various deployments, virtual assistants may be operated using smartphones, personal computers, and smart speakers.

SUMMARY

Embodiments of systems and methods for providing intelligent assistance to support agents are described. In an illustrative, non-limiting embodiment, an Information Handling System (IHS) may include: a processor; and a memory coupled to the processor, the memory having program instructions stored thereon that, upon execution, cause the IHS to: transmit audio to a voice service provider, wherein the audio is captured during a call between a customer and a support agent concerning a product; receive a text instruction from the voice service provider; retrieve support information relevant to the product based upon the text instruction; and display the support information to the support agent.

For example, the audio may include an utterance of a service tag by the customer. The program instructions, upon execution, may cause the IHS to obtain context information of the product during the call. The text instruction may be generated, at least in part, by brokering the use of different language models, where at least one of the different language models is selected based upon the context information. The support information may include at least one of: registration, warranty, or support history of the product. And the text instruction may include one or more keywords or phrases spoken during the call.

In some cases, the program instructions may cause the IHS to rank a plurality of support resources for the customer based, at least, in part, upon the one or more keywords or phrases. The text instruction may include customer emotion or sentiment information. Moreover, the program instructions may further cause the IHS to re-rank a plurality of support resources for the customer based, at least, in part, upon the customer emotion or sentiment information. Additionally, or alternatively, the program instructions may cause the IHS to re-rank the plurality of support resources in response to a detection of a change in the customer emotion or sentiment information during the call.

In another illustrative, non-limiting embodiment, a hardware memory device may have program instructions stored thereon that, upon execution by a processor of an IHS, cause IHS to: transmit audio spoken during a call between a customer and a support agent to a third-party voice service provider; retrieve support information relevant to the product based upon a text instruction received from the third-party voice service provider, where the third-party voice service provider is configured to generate the text instruction based upon the audio; and display the support information to the support agent during the call.

In yet another embodiment, a method may include: transmitting audio spoken during a call between a customer and a support agent to a third-party voice service provider; retrieving support information relevant to the product based upon a text instruction received from the third-party voice service provider, where the third-party voice service provider is configured to generate the text instruction based upon the audio; and displaying the support information to the support agent during the call.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
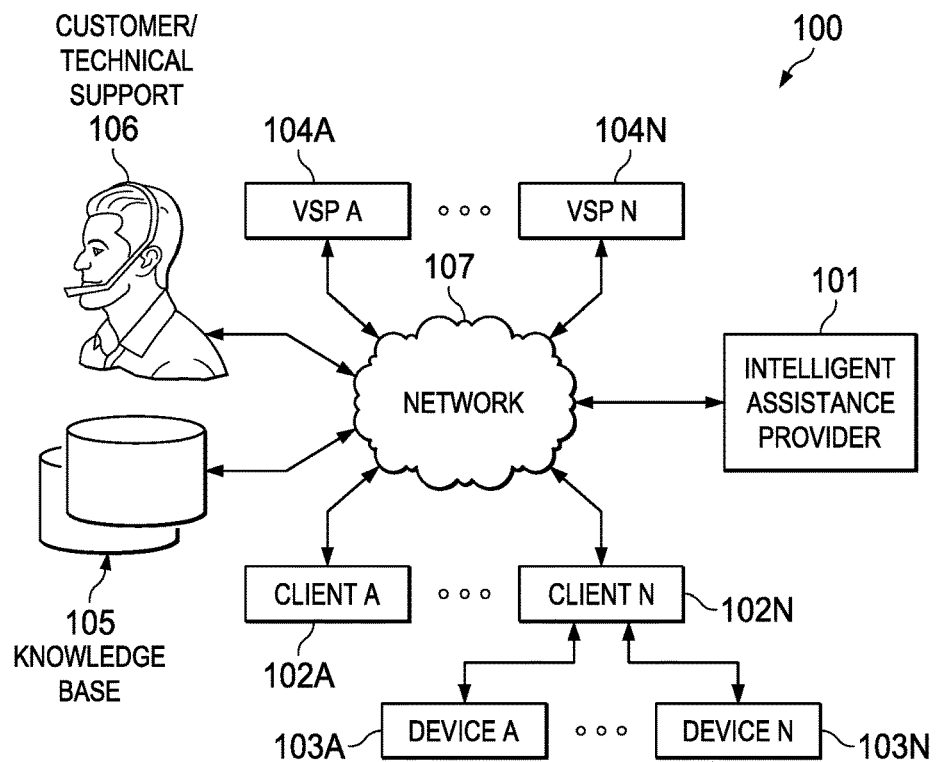
FIG. 1 illustrates examples of components of an intelligent assistance environment according to some embodiments.

FIG. 1 illustrates components of intelligent assistance environment 100. As depicted, environment 100 includes client computing devices 102A-N operated by human users.

Figure 2:
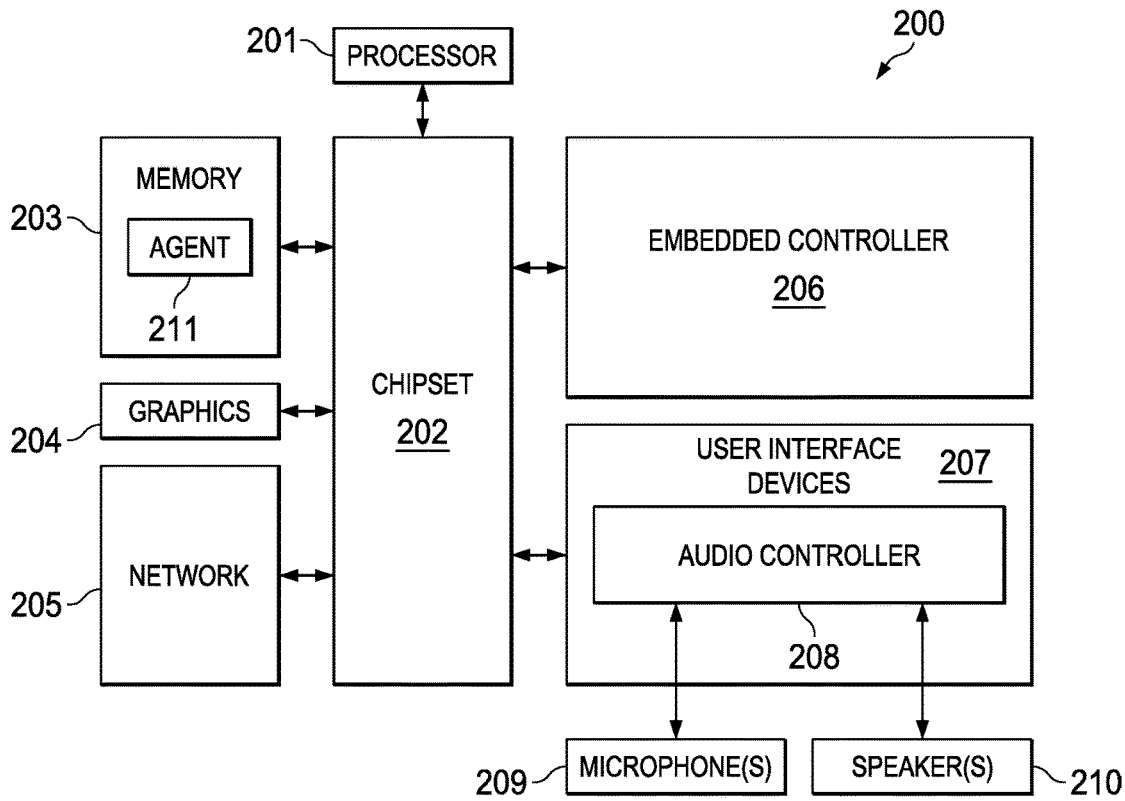
FIG. 2 illustrates examples of components of an Information Handling System (IHS) according to some embodiments.

For example, client computing devices 102A-N may be implemented as instances of Information Handling System (IHS) 200 shown in FIG. 2.

Client computing devices 102A-N may be coupled to network 107. Network 107 may include any combination of public switched telephone network (PSTN), packet-based communication network (e.g., the Internet), local area network (LAN), metropolitan area network (MAN), wide area network (WAN), or any other communications network, including a wireless network, a cable transmission system, a satellite transmission system, or the like.

Voice service providers (VSPs) 104A-N may also be coupled to network 107. Each of VSPs 104A-N may include one or more servers and/or cloud-compute resources configured to provide voice or speech-based assistance to the users of client computing devices 102A-N. In various implementations, VSPs 104A-N may include APPLE's SIRI, GOOGLE ASSISTANT, AMAZON ALEXA, MICROSOFT CORTANA, IBM WATSON, and/or certain components thereof, which may be available as a service to third-parties and/or developers.

In operation, software executed by client device 102A may detect an utterance or verbal command issued by the user. Client device 102A collects and packetizes the audio signal, and transmits the audio signal to at least one of VSPs 104A-N. The receiving VSP 104A-N decodes and/or interpret the contents of the packetized audio signal, and then performs some responsive action based upon the decoding and/or interpretation.

Voice commands interpreted by VSPs 104A-N can span a wide range of applications. In a simple scenario, when a user of client device 102A asks the time of day, VSP 104A may return an audio file with an audio response, which client device 102A may play back to the user through a speaker. In other scenarios, commands can be more complex: if a user asks client device 102A to play a song by a particular artist, VSP 104A may identify the name of artist in the user's utterance, and it may then search a third-party music service (e.g., over network 107) set up for that artist. Once the music service is found, VSP 104A may send a command to client device 102A to play the requested song.

In some cases, any number of peripheral devices 103A-N may be coupled to any one of client devices 102A-N (e.g., via Bluetooth, WiFi, etc.). Peripheral devices 103A-N may include various items such as: cameras, microphones, speakers, user interface devices (e.g., mouse, tablet, totem, etc.), or entire IHSs.

Intelligent assistance provider 101, knowledgebase provider 105, and customer/technical support provider 106 are all coupled to network 107. Customer/technical support 106 may enable any services by which an enterprise (e.g., a manufacturer) can provide hardware, software, or other assistance to users of client computing devices 102A-N. In different implementations, support services 106 may be delivered remotely via a website or live by a human being, using chat, messaging, phone calls, remote desktop connections, etc.

Knowledgebase 105 includes computing resources and/or databases configured to store complex structured and/or unstructured information, such as documents, articles, manuals, guides, diagnostics, electronic files, downloads, warranty documents, etc. relating to client computing devices 102A-N and/or their operation. In some situations, users operating devices 102A-N and/or support personnel 106 may have access to knowledgebase 105 in order to retrieve relevant documentation to help solve a technical problem, install or remove software, maintain hardware parts, perform virus scans or backup operations, etc.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 2 illustrates an example of components of IHS 200. In various embodiments, IHS 200 may be used to implement clients 102A-N and/or devices 103A-N. Moreover, the hardware components of IHS 200 may also be used to implement certain computing entities of knowledge base 105, customer/technical support provider 106, intelligent assistance provider 101, voice service providers 104A-N, and/or network 107.

As shown, IHS 200 includes processor 201. In various embodiments, IHS 200 may be a single-processor system, or a multi-processor system including two or more processors. Processor 201 may include any processor capable of executing program instructions, such as a PENTIUM, CORE, XEON, ATOM, or CELERON series processor, or any general-purpose or embedded processors implementing any of a variety of Instruction Set Architectures (ISAs), such as an x86 or x86-64 (AMD64) ISA, or a Reduced Instruction Set Computer (RISC) ISA (e.g., POWERPC, ARM, SPARC, MIPS, etc.).

IHS 200 includes chipset 202, which may comprise one or more integrated circuits (ICs) coupled to processor 201. In certain embodiments, chipset 202 may utilize a QuickPath Interconnect (QPI) bus to communicate with processor 201. Chipset 202 provides processor 201 with access to a variety of resources. For instance, chipset 202 provides access to memory 203. Memory 203 may be configured to store program instructions and/or data accessible by processor 201. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide access to graphics processor 204. In certain embodiments, graphics processor 204 may be part of one or more video or graphics cards installed as components of IHS 200. Graphics processor 204 may be coupled to chipset 202 via a graphics bus such as provided by an AGP (Accelerated Graphics Port) bus or a PCIe (Peripheral Component Interconnect Express) bus. In certain embodiments, graphics processor 204 may be integrated into CPU or processor 201. In operation, graphics processor 204 generates display signals and provides them to a monitor, panel, or other display device.

Other resources may also be coupled to processor 201 through chipset 202. For instance, chipset 202 may be coupled to network interface 205, such as a Network Interface Controller (NIC). In certain embodiments, network interface 205 may be coupled to chipset 202 via a PCIe bus or the like. In various embodiments, network interface 205 may support communication via various wired and/or wireless networks.

Embedded Controller (EC) 206 may be coupled to processor 201 via chipset 202 using SPI, eSPI, System Management Bus (SMBus), or shared interface techniques. Typically, EC 206 may be implemented as a microcontroller that handles tasks that the OS does not handle, such as receiving and processing signals from a keyboard, turning the IHS on and off, thermal measurement and response, controlling visual indicators, managing a battery, allowing remote diagnostics, service, and remediation, etc. In various embodiments, OS-to-EC Application Programming Interfaces (APIs) may be provided by EC 206 to the OS which allows the OS to make requests to EC 206 regarding various components of IHS 200.

User interface devices 207 may include a keyboard, trackpad, thumb drive, etc. In some embodiments, user interface device 207 may include audio controller 208, which may in turn be coupled to microphone(s) 209 and audio speaker(s) 210.

In some cases, audio controller 208 may include an audio front-end (AFE) configured to clean up input speech from near- and far-field sources, and a wake word engine (WWE) configured to recognize commands that trigger the launching or operation of a voice service. In many cases, audio controller 208 may include circuitry and/or program instructions configured to perform beamforming, echo cancellation, noise suppression, integrated audio decoding and post-processing, and/or multi-room networking and audio output.

Memory 203 may store program instructions that, upon execution by processor 201, provide intelligent assistant agent 211 configured to send utterances to VSPs 104A-N and/or to receive directives from intelligent assistant provider 101. Moreover, intelligent assistant agent 211 may be configured to perform operations usable to implement techniques described in more detail below. For example, intelligent assistant agent 211 may provide APIs to route commands to local applications that can handle those commands (e.g., retrieve support topics for a local technical support application, send and receive questions to customer/technical support provider 106, enable gaming capabilities in certain IHSs, specific platform functions, etc.). In some cases, intelligent assistant agent 211 or any portion thereof may be executed by audio controller 208.

In various embodiments, IHS 200 may not include each of the components shown in FIG. 2. Additionally, or alternatively, IHS 200 may include components in addition to those that are shown in FIG. 2 (e.g., storage devices, Super I/O controllers, USB ports, etc.). Furthermore, some components that are represented as separate components in FIG. 2 may, in some embodiments, be integrated with other components. In various implementations, all or a portion of the functionality provided by the illustrated components may be provided by components integrated as a System-On-Chip (SOC) or the like.

Figure 3:
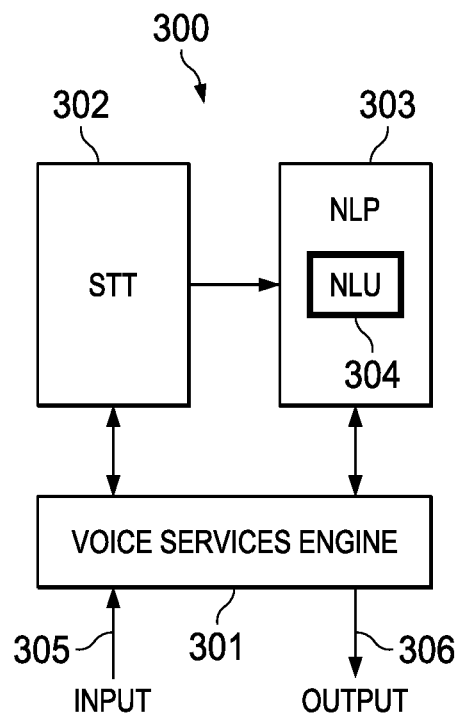
FIG. 3 illustrates examples of components of a voice service according to some embodiments.

FIG. 3 illustrates an example of voice service 300. In various embodiments, voice service 300 may be implemented by one or more of VSPs 104A-N shown in FIG. 1. Generally, voice service engine 301 receives input 305, and produces output 306 after processing input 305 through Speech-To-Text (STT) module or processor 302 and/or Natural Language Processing (NLP) module or processor 303, which includes Natural Language Understanding (NLU) module or processor 304 as a subset thereof.

Input 305 may include packetized or digitized audio collected, streamed, or otherwise transmitted by client devices 102A-N, as well as information about the client device itself, and/or the user (e.g., IP or MAC address, access credentials, etc.), and/or other contextual metadata (e.g., location, active application, etc.). STT module 302 enables engine 301 to transform the audio portion of input 305 into text, and NLP module 303 performs language syntax and semantics processing, turning text into structured data.

NLU module 304 may use a lexicon, a parser, and/or grammar rules to break sentences into internal representations. The language interpretation capabilities of NLU module 304 may depend on the internal semantic theory or algorithm it employs, which can use stochastic and/or pragmatic semantic analysis to derive meaning from context. In operation, NLU module 304 may enable voice service engine 301 to implement word filters, sentiment detection, topic classification, etc.

Figure 4:
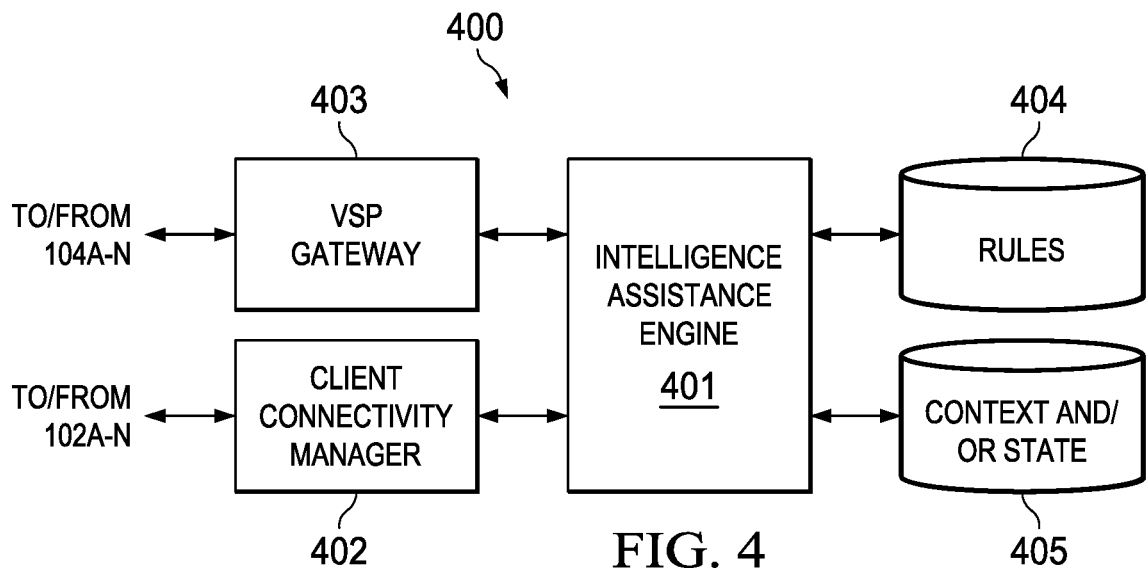
FIG. 4 illustrates examples of components of an intelligent assistance service according to some embodiments.

FIG. 4 illustrates an example of intelligent assistance service 400 that may be implemented by intelligent assistance provider 101 of FIG. 1. In various embodiments, intelligent assistance service 400 may enable various unique intelligent assistance features and functionality to users and client devices 102A-N using voice services 300 otherwise available from VSPs 104A-N.

Intelligent assistance engine 401 is coupled to client devices 102A-N via client connectivity manager 402, and it is coupled to VSPs 104A-N via VSP gateway 403. Intelligent assistance engine 401 may provide APIs that interface from the voice skills side (e.g., AMAZON's "AWS Lambda" or MICROSOFT's "Bot Framework") of VSP 104A-N (e.g., voice services engine 301) to one or more target client devices 102A-N. Intelligent assistance engine 401 may also be configured to route messages to a voice endpoint, which allows VSP 104A-N to reach a target client device or multiple devices, and/or to serve as a conection broker to client devices 102A-N (e.g., open low traffic connectivity for closed loop device control/access).

Particularly, client connectivity manager 402 may be configured to receive requests, instructions, information and/or output signals from client devices 102A-N, which may include, but are not limited to: a user's identification, preferences, and/or credentials (e.g., username, account name); the device's hardware and software identification and/or configuration (e.g., a manufacturer's service tag or serial number); use and/or deployment context (e.g., mode of operation, maximized/minimized or open/closed software applications); physical and/or geographical location (e.g., latitude and longitude, geographic market or region); identification, type and/or quality of network connectivity (e.g., IP address, MAC address, bandwidth); etc.

In some cases, client connectivity manager 402 may also receive an indication that a service provided by VSPs 104A-N has been accessed by client devices 102A-N, as well as any information associated with the service (or session), such as the VSPs 104A-N's response to request(s) issued by client devices 102A-N.

VSP gateway 403 may be configured to receive requests, instructions, information and/or output signals from any of VSPs 104A-N, which may include, but are not limited to: a VSP's identification, status, and/or configuration; input signal 305 and/or output signal 306; data from voice services engine 301, STT module 302, NLP module 303, and/or NLU module 304; etc. In some cases, VSP gateway 403 may also receive information associated with voice service requests request(s) issued by client devices 102A-N targeting VSPs 104A-N.

Intelligent assistant engine 401 also controls and maintains rules database 404 and context and/or state database 405, and each database is configured to store entries related to each of VSPs 104A-N and client devices 102A-N. In some cases, rules database 404 may include logic rules that determine aspects of the operation of engine 401, described in more detail below. Context and/or state database 405 may include, for each client device 102A-N and/or user, a current physical location, a list of open applications (minimized or maximized), available hardware resources, information about nearby devices, information about preceding voice-based interactions in the same or a different session, etc.

In some embodiments, databases 404 and 405 may be consolidated and/or physically distributed across different sites. Each of databases 404 and/or 405 may include any suitable type of application and/or data structure that may be configured as a persistent data repository. For example, databases 404 and 405 may be configured as relational databases that include one or more tables of columns and rows and that may be searched or queried according to a query language, such as a version of Structured Query Language (SQL). Alternatively, databases 404 and/or 405 may be configured as a structured data stores that include data records formatted according to a markup language, such as eXtensible Markup Language (XML). In various implementations, databases 404 and/or 405 may be implemented using one or more arbitrarily or minimally structured data files managed and accessible through any suitable type of application, and/or may include a database management system (DBMS) configured to manage the creation, maintenance, and use of databases 404 and/or 405.

In some embodiments, intelligent assistance engine 401 may be configured to provide voice-based functionality to client devices 102A-N that would otherwise not be available directly from VSPs 104A-N. Additionally, or alternatively, intelligent assistance engine 401 may be configured to complement, create, add, and/or modify certain voice-based functionality provided by VSPs 104A-N.

For example, intelligent assistance engine 401 may enable session-, context-, user-, and/or device-aware voice-based interactions, providing voice-based functionality in the area of device control. In these cases, engine 401 may interpret and/or modify input 305 and/or output 306 depending upon specific hardware and/or software features of a given client device, in order to control components of that client device.

Additionally, or alternatively, engine 401 may be configured to interpret and/or modify input 305 and/or output 306 depending upon user preferences, use, context, and/or mode (e.g., software application being executed, peripheral coupled to the client device, etc.). These interactions may take place, for example, during a technical support session with a live agent 106, or any other operation involving knowledgebase 105.

In other implementations, engine 401 may enable operations that are specific to a client device's out-of-box experience (OOBE), backup or maintenance processes, etc. In the case of OOBE, once an Operating System (OS) or other initial installation process has proceeded to a selected point, a voice serve may introduce itself (e.g., via an audio prompt), and the service may walk a user through a manufacturer's (or other) registration process.

Moreover, engine 401 may be configured to control multiple client devices, so support commands such as: "update all of my computers" and "lock all of my computers" may be executed. In some cases, engine 401 may enable operations beyond support software exoneration (e.g., maxed CPU, disk usage, optimizations), and may present a pathway to offer upgrades/accessories to make a customer's IHS faster, for example (e.g., HDD to SSD upgrade, addition of memory, and check system capabilities vs. updates available).

Other examples of capabilities enabled by engine 401 include platform device control (e.g., volume and display, as well as extended functions, such "locking or updating all of my computers."), level 1 technical support (e.g., information lookups, warranty info, optimizations, and level 1 support commands such as "why is my computer slow?"), and backup (e.g., proactive experiences and procedures for helping users to broker and setup backups using cloud storage or backup solutions).

Figure 5:
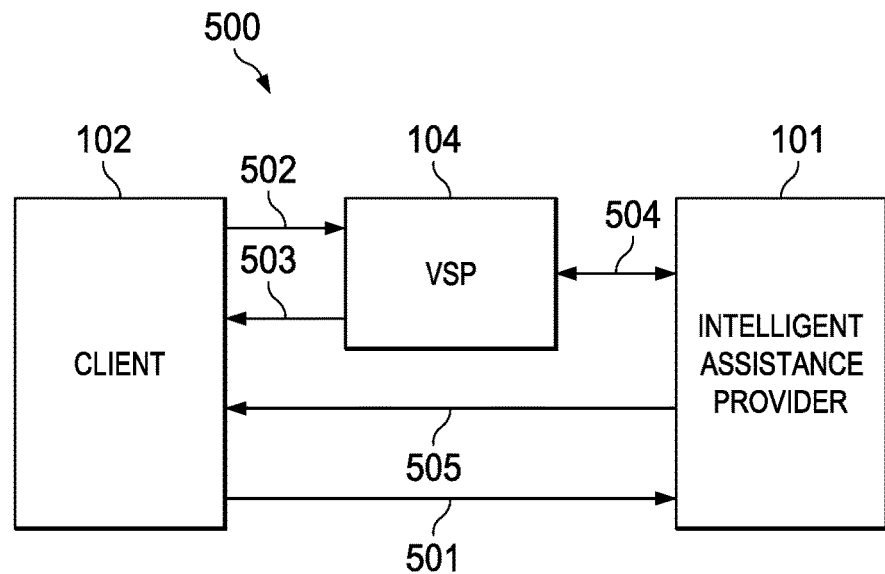
FIG. 5 illustrates an example of a method for providing intelligent assistance using voice services according to some embodiments.

FIG. 5 illustrates an example of method 500 for providing intelligent assistance using voice services. In some embodiments, method 500 may involve the participation of client 102 (e.g., one of clients 102A-N), VSP 104 (e.g., one of VSPs 104A-N), and/or intelligent assistance provider 101.

During operation of method 500, client 102 uses intelligent assistant agent 211 (in FIG. 2) to transmit identification, state, configuration, operation, and/or context information 501 to intelligent assistance provider 101. Then, client 102 captures and transmits audio instruction 502 to VSP 104. In response, VSP 104 converts audio instruction 502 into text instruction 504, and transmits text instruction(s) 504 to intelligent assistance provider 101. Then, client 102 receives command 505 from intelligent assistance provider 101, which is generated by provider 101 using text instruction(s) 504, and executes command 505.

In many cases, client 102 receives audio response 503 from VSP 104. In those cases, intelligent assistant agent 211 may be configured to synchronize playback of audio response 503 with execution of command 505, for example, when audio response 503 is received at a time different than (e.g., prior to) command 505. In some cases, playback of audio response 503 may be buffered pending execution of command 505. Additionally, or alternatively, execution of command 505 may be buffered pending playback of audio response 503.

Identification and/or context information 501, audio instruction 502, and/or text instruction(s) 504, may include a service tag of client device 102. As used herein, the term "service tag" refers to a unique number (or alphanumeric string) assigned to client 102 (often found on the bottom, side, or back of the product), as part of the manufacturing of client 102. In some scenarios, use of a service tag enables intelligent assistance provider 101 to generate command 505, for example, using technical support information associated with client 102, which many be stored by customer/technical support provider 106 and retrievable by intelligent assistance provider 101 over network 107.

Referring back to FIG. 4, in various embodiments, intelligent assistance provider 101 may be configured to generate command 505 by applying rules, stored in rule database 404, to context information 501 stored in context database 405, as context information 501 is provided to intelligent assistance provider 101 via client connectivity manager 405. As such, in these embodiments, command 505 may be generated based upon an interpretation of audio instruction 502 made in light of context information 501 that is not available to VSP 104.

In some cases, context information 501 may include a network connection state or physical location of client 102, and/or a time of audio instruction 502. Using location, network, and/or time information, intelligent assistance provider 101 may be capable of determine, for instance, whether client 102 is at a known work site at the time of instruction 502. If so, command 505 may enable operations in client 102 that cannot be made available off-site, such as: accessing out-of-band resources, handling selected documents, etc.—without VSP 104 having the location, network, and/or time information.

Additionally, or alternatively, context information 501 may include identification and status of a software application executable by client 102. Using the software application information, intelligent assistance provider 101 may be capable of determine, for instance, whether client 102 has the application installed and/or in execution, as well as whether the application is maximized, minimized, or closed, at the time of instruction 502. In these cases, command 505 may enable operations in client 102 that are specific to a particular application, such as: playing a media file, editing a document, performing a backup operation, etc.—without VSP 104 having the software application information.

Additionally, or alternatively, context information 501 may include an identification of hardware parts (e.g., components 201-210) or peripheral devices (e.g., devices 103A-N) coupled to client 102, such as name, type, model, status, etc. And, in these cases, command 505 may enable client 102 to apply command 505 to the hardware part or peripheral device—without VSP 104 having the hardware part or peripheral device information.

In various embodiments, text instruction(s) 504 may be generated, at least in part, by brokering the use of different language models during a speech recognition operation performed by VSP 104. Moreover, at least one of the different language models may be selected based upon context information 501. The selected language model may include a term, such as a brand, a service, a product, an operation, etc., that is relevant to client 102 having its current configuration as of the time of audio instruction 502—even if the term is not otherwise recognized by VSP 104 based upon audio instruction 502 alone, for example, using a generic language model.

In general, speech-to-text conversion may be accomplished using sets of data to train two components: (a) a recurrent neural network (RNN), which handles audio-to-character or phoneme conversion, and (b) a language model, which converts raw character/phoneme input into grammatically correct sentences and thoughts using n-gram beam search methods.

Additional context information (e.g., knowing that a user has a particular application running, for example), can enable context-based intelligent assistance systems and methods described herein to dynamically load a domain-specific language model in parallel to the primary general language model for accuracy refinement. Multiple hits on a particular domain model (evidence that a user is actively talking about a particular subject matter) may be used to improve prediction biases to the domain model. Additionally, deploying with domain-specific language models enables the retraining of a specific domain lexicon for lexical updates, rather than requiring retraining of the general language model. Domain-specific language models also facilitate multi-language domains to be isolated from their native language model supersets.

As such, systems and methods described herein may be said to be "speech engine agnostic," meaning that the intelligence assistance engine is capable of using any or all of voice services 104A-N to implement the same or different skills. It should be noted that the architecture described herein scales up to supporting millions of devices. In contrast, the industry's focus has been toward command/control or query/answer; not user experiences that interact with a user to solve problems and enable future use cases that require more than a simple cloud response/action. In the examples described herein, however, client device skills may be written that work whether using ALEXA, CORTANA, GOOGLE ASSISTANT, or any other suitable voice service.

Figure 6:
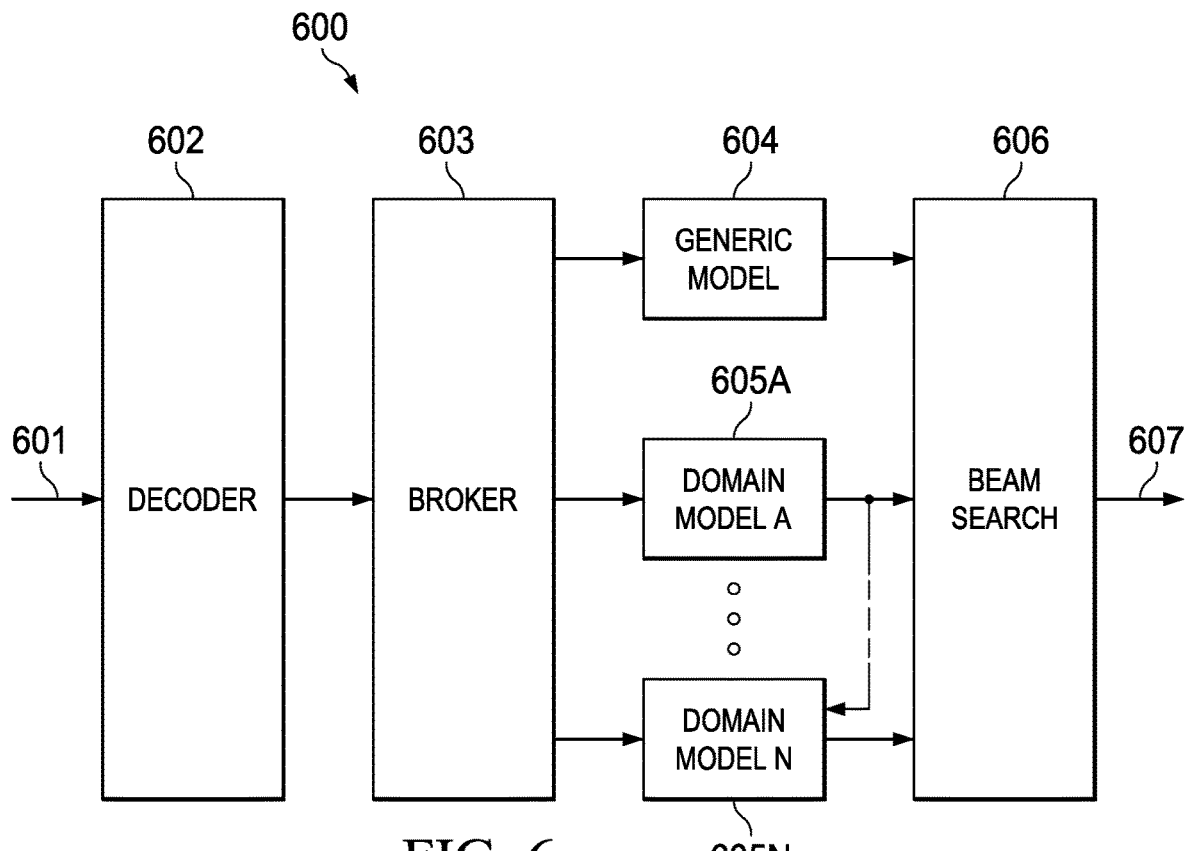
FIG. 6 illustrates an example of a method for providing context-based intelligent assistance according to some embodiments.

Turning now to FIG. 6, method 600 for providing context-based intelligent assistance is depicted. In various embodiments, method 600 may be performed exclusively by VSP 104, and each of components 602-606 may be implemented by voice services engine 301. Alternatively, method 600 may be performed exclusively by intelligence assistant provider 101, and each of components 602-606 may be implemented by intelligence assistance engine 401. Alternatively, method 600 may be performed through cooperation between VSP 104 and intelligence assistant provider 101, facilitated by an exchange of text message(s) 504, such that one or more of components 602-606 are implemented by intelligence assistance engine 401, and one or more other components 602-606 are implemented by voice services engine 301.

In operation, decoder 602 receives an audio portion 601 of audio instruction 301 and produces a connectionist temporal classification (CTC) output and associated score, as part of a recurrent neural network (RNN), which are then provided to model broker 603. Model broker 603 may apply generic language model 604 (e.g., for the English language) to the output of decoder 602, as well as any number of domain-specific language models 605A-N, which many be selected depending upon context information 501. The output of each of language model(s) 604 and 605A-N may be used by context-enriched, ensemble beam searcher 606 to produce text output 607 by returning a list of most likely output sequences, which are then usable to generate text instruction(s) 504.

In various embodiments, method 600 may use dynamic contextual knowledge from speech and non-speech sources to control loading and bias towards domain-specific language models. For sake of illustration, consider an example where the output of the generic language model provides the following text: "Cindy I was the alien we're nvidia Titan X. P. demo for cigarettes coming along." A first domain-specific language model 605A may be selected based upon context information 501 indicating that client 102 is from a given manufacturer, and therefore may include terms particular to products from that manufacturer. In this example, the output of first domain-specific language model 605A may include the term "Alienware" (which may also be provided to second domain-specific model 605B).

Still referring to the same example, second domain-specific language model 605B may be selected based upon context information 501 indicating that client 102 is configured with a particular graphics hardware part or peripheral component, and therefore may include terms particular to products from that hardware part or peripheral. And the output of second domain-specific language model 605B may include the terms "NVidia Titan Xp" and "Siggraph"). As a result, the output of beam searcher 606 may provide "Cindy how is the Alienware NVidia Titan Xp demo for Siggraph coming along?" after using the corrected words and grammar structures to fix "I was" and to add the question mark to complete the sentence.

In some cases, intelligent assistant agent 211 may include a conversational bot or chatbot software with a neural network-based speech to text engine at its core. The software may have knowledge of running user applications, service entitlements, geography, IT-managed internal company language models (e.g., including internal product and service names, etc.), calendar meetings, and organization directory data.

Domain-specific language models that may be used by the bot may include: (a) application-specific language models managed by application developers (e.g., cells, sheets, formulas, rows, columns, etc. for a spreadsheet application lexicon), (b) third-party user-added language models for personalization (e.g., putter, chip, pin, trap, drive, etc. for a golf lexicon), (c) geographic language models for landmarks, celebrity/political names, locations, etc., (d) internal company language models for common acronyms, products, services, and other company lingo that is managed by a central or team-specific authority (e.g., DELL product names such as ALIENWARE, PRECISION, OPTIPLEX, INSPIRON, XPS, etc.), and/or (e) organization directory data for employee/partner/customer name language models for richer interpretation and accuracy of names based on subject and parties involved in a meeting, for example.

In various embodiments, language models may be loaded into the speech-to-text engine permanently or dynamically based on contextual event data. In addition, language models may be weighted more heavily when domain models are being heavily used, and may be updated and managed independently of the rest of the solution, streamlining and enriching speech-to-text experiences.

In various implementations, systems and method described herein may enable the use of voice assistants to help a user with computer support and other integrated and/or extended activities beyond the otherwise simple question-and-answer response models that exist today. Moreover, these techniques may be scaled to handle millions of client devices 102A-N.

For example, audio instruction 502 may include a verbal registration request as part of an Out-of-Box-Experience (OOBE) of client device 102. In response, intelligent assistant provider 101 may check a registration record, and it may cause VSP 104 to return audio response 503 that allows the user to interactively proceed though one or more steps of a registration process to make the user aware of voice skills or commands available to client device 102.

For instance, online warranty registration may be performed using a service tag to tie client device 102 to the user's account, upon user's confirmation. Moreover, audio response 503 may describe functions available specifically to client device 102, such as: information and help functions; platform operation for device 102 (e.g., display control, volume control, locking, etc.) and/or other devices registered to the same user or in the physical vicinity of device 102; support, update, security, and backup operations; information about devices belonging to the same user account; etc. Furthermore, the systems and methods described herein may provide a pathway to offer the user upgrades and/or accessories to client device 102 (e.g., audio instruction 502 may check system capabilities against updates available).

Examples of audio instructions 501 and responses 503 that enable platform operations according to systems and methods described herein may include, but are not limited to: "When is my next meeting?", "increase brightness," "pair to Bluetooth speaker," "get battery level," "alert me when my battery gets to 20%," "open CHROME," "play music," "go to sleep," "take a screenshot," "mute my computer," "open final presentation," "find an open conference room," "turn on Wi-Fi," "next song," "turn up system volume," "turn on battery saver," "set volume to 50%," "what's on my calendar today," "go to the next slide," "enable do not disturb," "tell my computer goodbye," "login as Sam," "install support software," etc.

Examples of audio instructions 501 and responses 503 that enable support operations according to systems and methods described herein may include, but are not limited to: "you seem to have a runaway process," "install support assistance," "how do I extend my battery life," "update my system," "what is my service tag," "my computer has a virus," "why is my system slow," "what is my express code," "how can I make my system faster," "contact the manufacturer," "help free up space," "optimize my system," "why is my screen blank," "clean my computer," "when does my warranty expire," "it looks like your hard drive will fail soon," "what is my warranty," "upgrade my warranty," "we have noticed your battery is failing," "you have not backed up your computer recently, would you like me to help you with that," "your system is vulnerable, would you like me to update it," etc.

When handling a technical or customer support call, a support agent juggles a myriad of distracting functions while striving to provide the best, and often monitored, customer experience possible. Responsibilities may include getting product information from the customer, verifying/checking the warranty type and status, and engaging the customer or user to understand the issue at hand. The support agent then needs to maintain customer engagement while searching for a solution to the customer's problem, before ultimately walking the customer through a solution.

To address these, and other problems, systems and methods described herein may provide tools with new capabilities targeted at helping the support agent. These systems and methods may monitor an ongoing call between the agent and the customer in real-time, and may help the agent with several aspects of managing the call. For example, systems and methods described herein may listen for a product ID or service tag, and may retrieve warranty and past history of the client 102 (and/or of the customer) for the support agent. These systems and methods may also listen and monitor the call for keywords to map to known knowledgebase solution articles, and provide that list to the support agent with a confidence level that improves as the conversation continues. In addition, customer sentiment (e.g., joy, anger, fear, sadness etc.), may also be monitored in real-time to guide the support agent in helping the customer.

Figure 7:
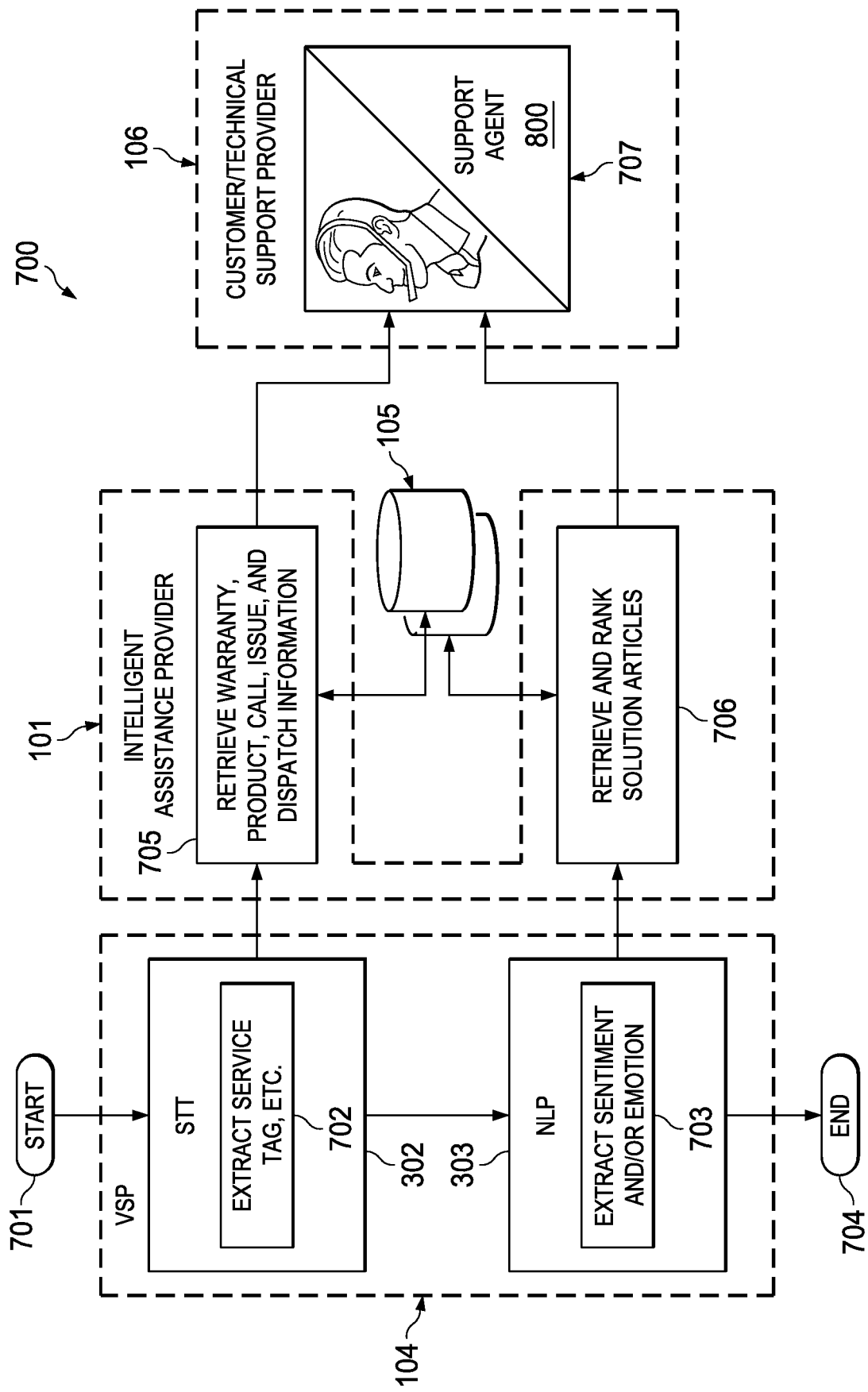
FIG. 7 illustrates an example of a method for providing intelligent assistance to support agents according to some embodiments.

FIG. 7 illustrates an example of method 700 for providing intelligent assistance to support agents 106. In some embodiments, method 700 may be performed during an ongoing voice call between a user (or customer) of client device 102 and support agent 106, to provide the ability to monitor the call and to use STT and NLP technologies to actively and more accurately over time map conversations to solutions that can resolve relevant issues in the customer call. In other embodiments, however, techniques described herein may also be used, for example, with chatbots and recorded calls.

Method 700 starts at 701, automatically at the beginning of the call, manually triggered by support agent 106 after the call has begun, and/or in response to an event taking place during the call (e.g., detection of a selected utterance, command via a graphical user interface, etc.).

At block 702, method 700 may include extracting a service tag or other product identifier from an utterance made by the user or customer during the call. For example, method 700 may include capturing audio spoken by the user during the call, and transmitting the audio to be processed by STT module 302 of VSP 104. In some cases, audio may be captured for a certain time duration, and transmitted to VSP 104 periodically or upon command. In other cases, however, audio may be captured live and continuously streamed to STT module 302 in real-time.

At block 705, intelligent assistance provider 101 receives a text instruction from VSP 104 identifying the service tag; and it retrieves warranty, product, call, issue, and/or part dispatch information, for example, from customer service database or knowledgebase 105. At block 707, intelligent assistance provider 101 provides the retrieved information to technical customer support 106. In some cases, this information may be used by support agent application 800 to rank an initial set of articles, documents, and other technical or customer service resources for presentation, delivery, or discussion with the user or customer during the call.

At block 703, method 700 may include extracting selected keywords, phrases, emotion, and/or sentiment information of the user or customer during the call. For example, method 700 may include capturing audio spoken by the user during the call, and transmitting the audio to be processed by NLP module 303 of VSP 104. Again, in some cases, audio may be captured live and streamed to NLP module 303.

At block 706, intelligent assistance provider 101 receives another text instruction from VSP 104 identifying a selected keyword(s), phrase, emotion, and/or sentiment; and it retrieves additional support information from customer service database or knowledgebase 105. At block 707, intelligent assistance provider 101 provides the retrieved information to support agent application 800. In some cases, this information may be used by support agent application 800 to re-rank the initial set of articles, documents, and other technical or customer service resources, and/or to change the contents of the set as the call progresses, until method 700 reaches block 704.

Figure 8:
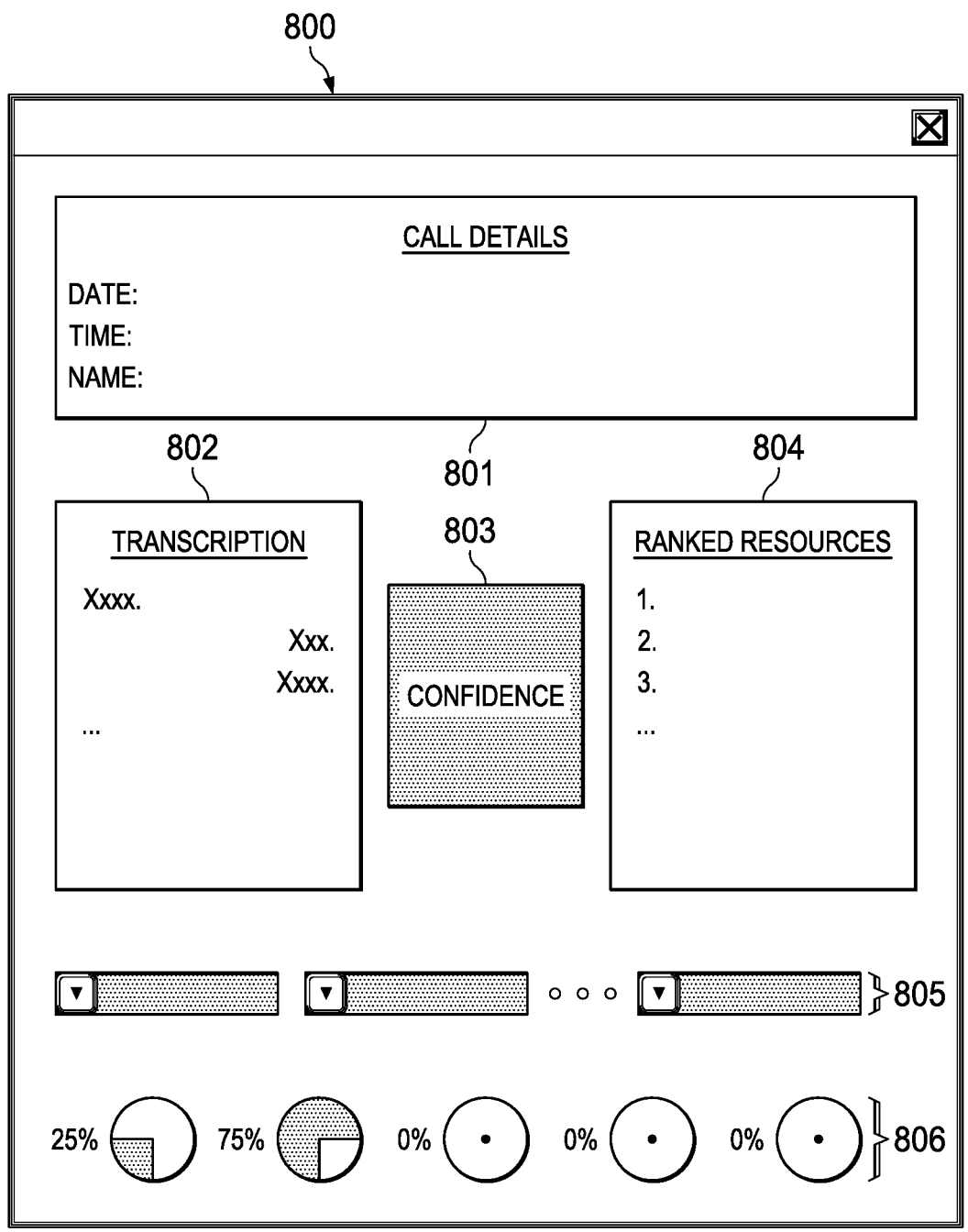
FIG. 8 illustrates an example of a user interface for providing intelligent assistance to support agents according to some embodiments.

FIG. 8 illustrates an example of Graphical User Interface (GUI) 800 for providing intelligent assistance to support agents. In some embodiments, GUI 800 may be produced by a computing device similar to IHS 200, while the computing device is operated by a technical or customer support agent 106. As shown, GUI 800 comprises Call Detail Record (CDR) or identifier portion or window 801, which may include information such as a time, date, duration of an ongoing call, the name or identification of any party to the call, etc.

GUI 800 also comprises transcription portion or window 802, which includes a text of utterances or other features captured and recognized during the call, as received from VSP 104. Confidence indicator 803 shows a confidence level of the recognition process at the current time (or a weighted average), as also indicated by VSP 104. Ranked resources portion or window 804 includes a ranked list of documents (or links thereto) that are relevant during the call, for instance, based upon a prior history of support.

Controls 805 enable support agent 106 to retrieve information associated with a service tag, for example, such as warranty, related issues, key phrases, and last support call about the product. And engagement metrics 806 show various levels of customer emotion or sentiment during the call (e.g., anger, fear, disgust, joy, sadness, etc.).

In various cases, text instruction(s) or metadata from VSP 104 identifying keyword(s), emotion, and/or sentiment, as these variables change during the call, can facilitate a dynamic re-ranking of resources most likely to satisfactorily solve a customer issue. Sentiment analytics may be displayed for the support agent in real-time, and/or an overall assessment at end of call may be provided.

Moreover, NLP classification by VSP 104 may be updated as the call progresses and keywords for a particular client 102 (or type of client) are mapped to solution articles from knowledgebase 105. Closed loop correlation may be performed between issues resolved for helping future calls ("did this fix the problem?") using aggregate data, as well as between telemetry obtained from client agent 211 and/or EC 206, identified issues, and solutions, including sentiments. Moreover, a closed loop across multiple calls may be used to derive root cause, endemic problem identification, trending issues, etc.

In some cases, a ranking algorithm may use keyword searches matched to solution articles with or without support agent's involvement or voting, using machine learning techniques or neural networks. The ranking algorithm may use context awareness (e.g., known client 102, past issues, similar issues on different instances of the same client platform, etc.) to drive results. In some cases, ranked solutions may provide a support agent with a time estimated for resolution of the issue, and % chance that the solution resolves issue.

If the service tag indicates that client 102 and/or the customer is in an out-of-warranty situation, for example, ranked solutions may provide the support agent guidance on time to help (e.g., minimal help) that have correlation with future sales. Additionally, or alternatively, ranked solutions in this case may instruct the support agent to direct the customer to an alternative support provider, for example, for added-cost services. In some cases, the ranking between solutions in both scenarios may be change in response to different customer sentiments expressed in real-time during the call.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a microphone; and
a memory coupled to the processor, the memory having program instructions stored thereon that, upon execution, cause the IHS to:
   transmit audio to a voice service provider, wherein the audio is captured by the microphone during a call between a customer and a support agent concerning a product and comprises an utterance of a service tag by the customer;
   obtain context information of the product during the call;
   receive a text instruction from the voice service provider, wherein the text instruction comprises one or more keywords or phrases spoken during the call, wherein the text instruction is generated, at least in part, by brokering the use of different language models, and wherein at least one of the different language models is selected based upon the context information;
   retrieve support information relevant to the service tag based upon the text instruction, wherein the support information comprises at least one of: registration, warranty or support history of the product;
   retrieve a plurality of resources relevant to the product and rank the plurality of resources based, at least in part, upon one or more keywords or phrases, wherein the plurality of resources comprises technical documents related to the product; and
   display the support information and a ranked list of links to each of the plurality of ranked resources to the support agent.

2. The IHS of claim 1, wherein the text instruction comprises customer emotion or sentiment information.

3. The IHS of claim 2, wherein the program instructions, upon execution, further cause the IHS to re-rank a plurality of support resources for the customer based, at least, in part, upon the customer emotion or sentiment information, and to modify the display of the ranked list of ranked support resources to the support agent accordingly.

4. The IHS of claim 3, wherein the program instructions, upon execution, further cause the IHS to re-rank the plurality of support resources in response to a detection of a change in the customer emotion or sentiment information during the call, and to modify the display of the ranked list of ranked support resources to the support agent accordingly.

5. A hardware memory device having program instructions stored thereon that, upon execution by a processor of an Information Handling System (IHS), cause the IHS to:
   capture audio spoken during a call between a customer and a support agent concerning a product using a microphone coupled to the IHS and transmit the audio to a third-party voice service provider, wherein the audio comprises an utterance of a service tag made during the call comprises one or more keywords or phrases spoken during the call;
   obtain context information during the call;
   retrieve support information relevant to the service tag based upon a text instruction received from the third-party voice service provider, wherein the third-party voice service provider is configured to generate the text instruction based upon the audio, at least in part, by brokering the use of different language models, wherein at least one of the different language models is selected based upon the context information, wherein the text instruction comprises one or more keywords spoken during the call, and wherein the support information comprises at least one of: registration, warranty, or support history;
   retrieve a plurality of support resources relevant to the product and rank the plurality of support resources based, at least, in part, upon the one or more keywords, wherein the plurality of support resources comprises technical documents related to the product; and
   display the support information and a ranked list of links to each of the plurality of ranked resources to the support agent during the call.

6. The hardware memory device of claim 5, wherein the text instruction comprises customer emotion or sentiment information, and wherein the program instructions, upon execution, further cause the IHS to re-rank the plurality of support resources based, at least, in part, upon the customer emotion or sentiment information, and to modify the display of the ranked list of ranked support resources to the support agent accordingly.

7. A method performed by a processor, comprising:
   capturing audio spoken during a call between a customer and a support agent about a product using a microphone coupled to an IHS and transmitting the audio to a third-party voice service provider, wherein the audio comprises an utterance of a service tag made during the call comprises one or more keywords or phrases spoken during the call;
   obtaining context information during the call;
   retrieving support information relevant to the service tag based upon a text instruction received from the third-party voice service provider, wherein the third-party voice service provider is configured to generate the text instruction based upon the audio, at least in part, by brokering the use of different language models, wherein at least one of the different language models is selected based upon the context information, wherein the text instruction comprises one or more keywords spoken during the call, and wherein the support information comprises at least one of: registration, warranty, or support history;
   retrieve a plurality of support resources relevant to the product and rank the plurality of support resources based, at least, in part, upon the one or more keywords, wherein the plurality of support resources comprises technical documents related to the product; and
   displaying the support information and a ranked list of links to each of the plurality of ranked resources to the support agent during the call.

8. The method of claim 7, wherein the text instruction comprises customer emotion or sentiment information during the call, the method further comprising re-ranking the plurality of support resources during the call based, at least, in part, upon the customer emotion or sentiment information, and modifying the display of the ranked list of ranked support resources to the support agent accordingly.

* * * * *